Patented Sept. 24, 1935

2,015,593

UNITED STATES PATENT OFFICE 2,015,593

MANUFACTURE OF ADSORBENTS

Ralph B. Derr, Oakmont, Pa., assignor to Aluminum Company of America, Pittsburgh, Pa., a corporation of Pennsylvania No Drawing. Application February 24, 1932,
Serial No. 594,970

8 Claims. (Cl. 252—2)

This invention relates to the treatment of material composed in whole or in substantial part of alumina to produce a material having improved adsorptive properties. For the purposes of the following specification and the appended claims such material possessing adsorptive powers will be referred to by its common designation, "activated alumina".

Activated alumina is one of that well-known class of substances which, although differing in composition, structure and properties, have as a common property the power of separating by adsorption or absorption a gaseous "phase" from a gaseous "phase", a liquid phase from a liquid phase, a solid phase from a liquid phase, etc.

In present-day arts such as refrigeration, air conditioning, gas purification and the like, adsorbing bodies find a widespread and important application.

Adsorbing bodies should possess at least two characteristics, viz., they should be capable of selectively adsorbing in or on their surface a substance or phase from a mixture of substances or phases; and they should be capable, under usual conditions, of being so treated as to remove the adsorbed substance or phase. An adsorbing body may be said to be "activated" when it possesses the first of these characteristics and may be said to be capable of "reactivation" when it possesses the second characteristic.

The capacity of an adsorbing body may be expressed by many standards, any of which is purely relative and but a function of the power of the body to adsorb a given substance or phase. The results herein described as obtained from and by the methods herein mentioned are expressed in relation to the capacity of the adsorbing body to remove moisture from air since, as a general rule, an increased capacity of the adsorbing body to perform this function is reflected in the separation of other substances or phases. Therefore the capacity of the activated alumina with which this invention is concerned may be expressed by the percentage of its own weight of water which the material will adsorb under given conditions and still remove 100 per cent or substantially 100 per cent of the moisture of the air under treatment; or, in shorter terms, the per cent capacity of the material to operate at 100 per cent efficiency.

Activated alumina is usually prepared by calcining aluminum trihydrate, or a material, such as bauxite, containing aluminum trihydrate, or the material formed as a hard scale on the inside of the alumina precipitation tanks used in the Bayer process, the temperature of the calcination being between about 300° C. and 800° C. Above this latter temperature a change (supposedly allotropic) is produced which seriously affects the adsorptive capacity. Below about 300° C. activation by calcination is neither sufficiently rapid nor complete. After the activated alumina thus formed has been in use for a time the substance which it adsorbs in or on its surface tends to diminish its adsorptive capacity and finally a point is reached where the material becomes inefficient and must be "reactivated" to remove the adsorbed substance and restore its adsorbent properties. If this adsorbed substance is volatile or gaseous, reactivation may be accomplished by heating at a somewhat lower temperature, principally for economic reasons, than was employed for the initial activation. The present invention is concerned primarily with the treatment of the aluminum trihydrate for its initial activation, but can in some cases be used to advantage for reactivation.

In experimenting with the activation of alumina-containing substances, it has been found that at times the finished product does not have the capacity for adsorption which at other times appears to be characteristic. Such deficiency in adsorption capacity is particularly noticeable when, as in large scale commercial practice, the activation is carried out on a large bulk or mass of material. In such cases a decrease in the capacity of the treated product is often noted.

In attempting to avoid the trouble noted I have discovered that the adsorptive capacity of the treated alumina or alumina-containing material is considerably increased when any steam or water given off by the material during treatment is promptly removed from contact with the material or if contact is minimized to a considerable extent. In the activation treatment of alumina-containing materials in which the alumina is present in the form of the hydrate, such as $Al_2O_3.3H_2O$, a part of the combined water is driven off during the process of heating as well as any water present which is not chemically combined. The steam or water vapors resulting from such treatments have, in prior processing, been allowed to remain in the chamber in which the material is being treated, and where the bed of material was large or deep this condition was aggravated because the steam or water vapors could not easily and quickly escape from the bed.

In accordance with my invention the steam or water vapors are promptly removed from contact with the material being treated and this removal is preferably effected so that it is continuous, rapid, and as complete as possible, irrespective of the size or depth of the bed. Under such conditions of treatment the adsorptive capacity of the material produced is increased and in some instances a material which could be produced under prior practice with an adsorptive capacity of only 8 per cent at 100 per cent efficiency, can be produced in accordance with my invention with an adsorptive capacity of 14 per cent at 100 per cent efficiency.

In the practice of my invention I prefer to employ either of two procedures which I have found to be particularly efficient in large scale operation. In the first of these the material to be activated is placed in beds or layers in a chamber and heated gas is drawn into the chamber through the bed and out of the chamber in a continuous flow. As a gas I prefer to use air or gases of combustion. The gas should preferably be heated to a temperature of about 350° C., but temperatures between about 250 and 800° C. are satisfactory. In practical operation I have found that air heated to temperatures between about 250 and 450° C. will produce advantageous results. Temperatures of 350 to 400° C. are most satisfactory.

In the second preferred practice the material to be treated is placed in beds or layers in a closed chamber and is then heated. By any convenient means a partial vacuum is produced and maintained in the chamber. The activation takes place rapidly and the steam or water vapor resulting therefrom passes quickly and continuously from the chamber. When alumina-containing material is being activated under partial vacuum, the material should preferably be heated at temperatures above about 250° C. and below about 800° C. In large scale operation temperatures of 300° to 400° C. are most satisfactory.

I have also found that adsorptive capacity of activated alumina may be materially increased if before the activation the alumina-containing material is washed with a solution of an acid such as sulphuric, hydrochloric, or acetic acid or an acid salt such as aluminum sulphate (all of which are comprehended in the claims by the word "acid"). For instance, when aluminum trihydrate obtained in the Bayer process is first washed with an aqueous solution containing about 3 per cent by weight of sulphuric acid and is thereafter treated as herein described the adsorptive capacity at 100 per cent efficiency of the activated alumina thus produced is usually increased by about 1 to 2 per cent, being in some cases as high as 16 per cent at 100 per cent efficiency. Although my invention is not limited thereto, the preliminary treatment of the material with a solution of an acid or an acid salt is very desirable.

It is to be understood that the invention is not confined to the specific procedures herein described but may be carried out in other ways without departure from its spirit as defined by the following claims.

I claim—

1. The method of activating material containing major quantities of hydrated alumina comprising washing the material with a solution of an acid, heating the thus treated material to remove therefrom chemically bound and mechanically held water, and withdrawing from the material vapors formed by said heating sufficiently rapidly and in such manner as to reduce subsequent adsorption of the vapors by the material.

2. The method of activating material containing major quantities of hydrated alumina, comprising placing a mass of the material in a chamber, and passing through said material and out of said chamber a continuous flow of gas heated to temperatures above about 250° and below about 800° C.

3. The method of activating alumina-containing material comprising washing the material with a solution of an acid, placing a mass of the acid-washed material in a chamber, and passing through the acid-washed alumina-containing material a continuous flow of gas heated to temperatures above about 250° and below about 800° C.

4. The method of activating alumina-containing material comprising washing the material with a solution of an acid, placing a mass of said acid-washed material in a closed chamber, heating the material to a temperature of over about 250° and below about 800° C. while simultaneously producing in said chamber a partial vacuum whereby the vapors created by said heating are rapidly removed from contact with said material.

5. The method of producing activated amorphous alumina-containing material comprising placing a bulk of the material in a closed chamber, heating the material to a temperature between about 250° and 800° C. while simultaneously producing in said chamber a partial vacuum, whereby the vapors created by said heating are rapidly removed from contact with said material.

6. The method of preparing aluminum trihydrate for use as an adsorbent which comprises placing a mass of the trihydrate in a chamber, heating the material at a temperature which is high enough to drive off rapidly water combined in the trihydrate and any water carried by the trihydrate which is not chemically combined, but which temperature is not high enough to cause an allotropic change in the heated mass, and simultaneously with such heating rapidly withdrawing from the mass of trihydrate the water vapors created by said heating to reduce substantially subsequent contact of said vapors with the trihydrate.

7. The method of preparing aluminum trihydrate for use as an adsorbent which comprises washing the trihydrate in an aqueous solution containing about 3% by weight of sulphuric acid, placing the acid washed material in a chamber, heating the material at a temperature which is high enough to free combined water from the trihydrate and any water present which is not chemically combined and which temperature is not so high as to create an allotropic condition in any of the material, and simultaneously with said heating rapidly withdrawing from contact with the material the water vapors created by said heating.

8. The method of activating material composed largely of hydrated alumina comprising heating the material to free therefrom chemically bound or mechanically held water and removing the vapors formed by such heating sufficiently rapidly and in such manner as to reduce substantially subsequent contact of said vapor and said material.

RALPH B. DERR.